June 18, 1940.  S. E. ADAIR  2,205,185
LANDING SYSTEM
Filed Feb. 10, 1937
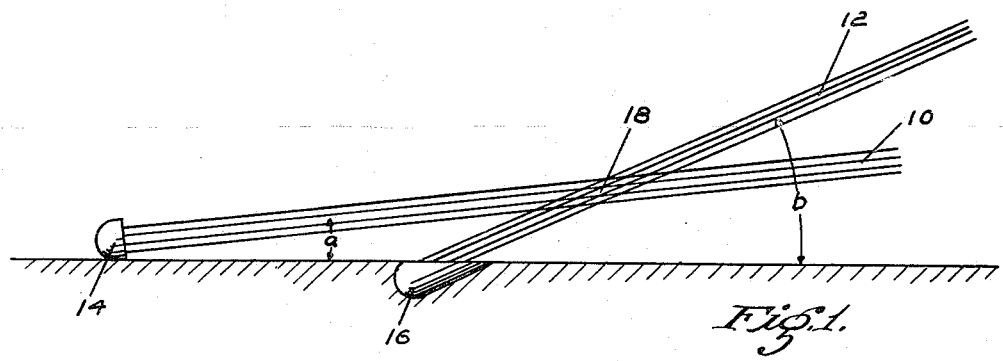
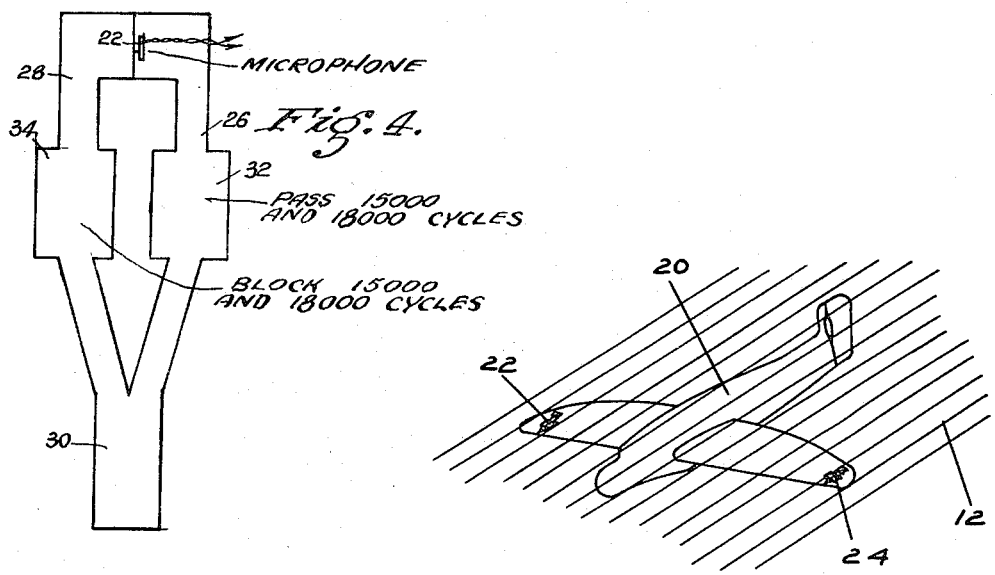
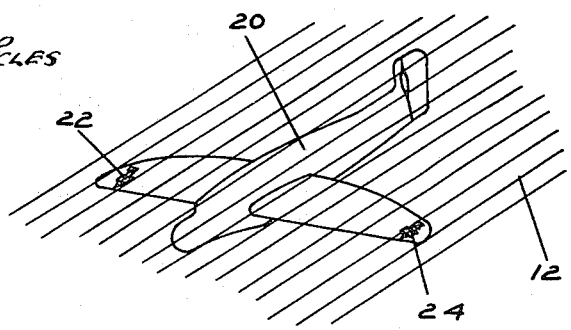
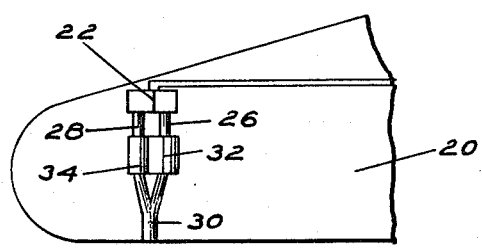
INVENTOR.
SAMUEL E. ADAIR
BY McConkey & Booth
ATTORNEYS.

Patented June 18, 1940

2,205,185

UNITED STATES PATENT OFFICE 2,205,185

LANDING SYSTEM

Samuel E. Adair, Chicago, Ill., assignor, by mesne assignments, to Bendix Radio Corporation, Baltimore, Md., a corporation of Delaware Application February 10, 1937, Serial No. 125,112

7 Claims. (Cl. 177—352)

This invention relates to the landing of aircraft and more especially of airplanes, on landing fields. An object of the invention is to provide means for guiding planes in landing, in a fog for example, without the use of radio, either as the sole means for guiding the planes or as an auxiliary emergency guiding means for use when something goes wrong with the radio blind landing system.

This object is accomplished by the use of intersecting beams of super-sonic sound waves, i. e. sound waves above audible frequencies, arranged in a novel manner as described below to guide the plane down on a gliding angle to a zone of intersection at the proper height for leveling off for landing, the frequencies of the two beams being so selected as to produce at the zone of intersection a beat note in the detecting apparatus at a third and lower (and preferably audible) frequency, the indication of which warns the pilot to level off.

The above and other objects and features of the invention will be apparent from the following description of the landing of a plane as illustrated in the accompanying drawing, in which:

Figure 1 is a diagrammatic vertical section through a landing field, in the plane of the intersecting beams of sound;

Figure 2 is a diagrammatic perspective view of a plane following one of the beams; and Figure 3 is a diagrammatic plan view of one wing-tip of the plane, illustrating the arrangement of one of the microphones for detecting the sound waves.

Fig. 4 is a horizontal section of the wing installation shown in Fig. 3, showing the intake and filter passages together with the microphone chamber.

As illustrated in Figure 1, the landing field is provided with means, of any well known character, for generating two sets of sound waves of different frequencies (for example 15,000 and 18,000 per second) of supersonic frequencies, and which are directed in beams 10 and 12, at different angles a and b to the surface of the field by means such as accoustic projectors 14 and 16.

The accoustic projector 14 and its power source may conveniently be mounted on a sound truck, so that the beam may be directed down-wind (so that the plane will land headed into the wind in landing) from the edge of the field. There may be a plurality of projectors 16, arranged annularly about the center of the field and facing outwardly, or means may be provided for mounting the same projector at different points, so that the beam 12 may be directed down-wind from a position such that there is adequate space behind it for landing the plane. The beam 12 is at a gliding angle, and the beam 10 at a flatter angle suitable for landing.

The two beams intersect in a zone 18 at the height where the pilot should level off for landing, and at this intersection they produce a beat note in the detecting apparatus at a third and lower frequency, which would for example be 3,000 beats per second if the beams 10 and 12 are at frequencies of 15,000 and 18,000. At any rate I prefer to select the frequencies so that the beat notes are at an audible frequency, and will literally shout at the pilot when it is time to level off.

The plane 20 is provided with detecting means, of any suitable and well-known character, including microphones 22 and 24 at the wing tips. The microphones, one of which is indicated diagrammatically at 22 as a diaphragm in Figure 3, may be arranged to be acted on from both sides through branching passageways 26 and 28, leading from an intake passage 30 facing in the direction of flight. The one passage, for example 26, is provided with an accoustical filter 32 designed to pass only the selected frequencies (15,000 and 18,000) and the other passage 28 with a filter 34 which will not pass those frequencies. A more desirable method is to employ two filters, one of which passes all frequencies and the other of which passes all except the selected frequencies. Thus ordinary noises as well as air pressure entering the intake passage 30 act equally on both sides of the microphone, and cancel themselves out, whereas the two frequencies to be detected act only on one side of the microphone. Preferably the filters 32 and 34 are tuned resonant chambers as will be understood. The waves so detected by the microphone may be amplified in the usual manner, to show on an indicator of any desired character on the instrumen. board of the plane, and to cause the beat notes to actuate a suitable loud speaker or the pilot's head telephones. Suitable filters may be used to peak the response of the indicator at the selected frequencies. If the plane at any time goes above or below the beam the effect of the sound beam on the microphone will be appreciably less and consequently this will be shown on the indicator. The indicator may also be arranged in a known manner to show a difference in phase in the sound waves picked up by the two microphones so that if the plane is not going directly into the beam, i. e. to the right or left, the microphone on one wing will pick up the beam at a different part of the wave than the microphone on the other.

The pilot approaches the airport, flying into the wind, until he picks up the beam 12, and then flies straight into the beam until he reaches the intersection 18, where he levels off and follows beam 10 to a landing.

While one particular arrangement has been described in detail, it is not my intention to limit the scope of the invention by that description, or otherwise than by the terms of the appended claims.

I claim:

1. That method of guiding a plane in landing on a field which comprises directing, substantially at a gliding angle down-wind from a position in the field leaving adequate landing space behind it, a sound beam at a supersonic frequency, directing a plane in a direction following said beam downward toward the field, directing at a flatter angle suitable for landing and in the same direction as the first beam and intersecting the first beam at a height where the plane should level off, from the edge of the field, a second supersonic beam at a frequency differing from the first frequency by such an amount as to produce a beat note at an audible frequency where the beams intersect, leveling off the plane when said note is heard, and landing the plane approximately at said flatter angle.

2. That method of guiding a plane in landing on a field which comprises directing, substantially at a gliding angle from a position in the field leaving adequate landing space behind it, a sound beam at a supersonic frequency, directing a plane in a direction following said beam downward toward the field, directing at a flatter angle suitable for landing and in the same direction as the first beam and intersecting the first beam at a height where the plane should level off, from the edge of the field, a second sound beam at a supersonic frequency differing from the first frequency by such an amount as to produce a beat note at a lower frequency where the beams intersect, leveling off the plane when said beat note is detected, and landing the plane approximately at said flatter angle.

3. A landing field having means for directing down-wind substantially at a gliding angle from a position leaving adequate landing space behind it a sound beam at a supersonic frequency, and having means for directing from the edge of the field behind said position a second beam at a flatter angle in the same direction as the first beam and intersecting the first beam at a height suitable for leveling a plane off for landing and of supersonic frequency differing from the frequency of the first beam by such an amount as to produce at the intersection of the beam a beat note at an audible frequency.

4. A landing field having means for directing substantially at a gliding angle from a position leaving adequate landing space behind it a sound beam at a supersonic frequency, and having means for directing from the edge of the field behind said position a second beam at a flatter angle in the same direction as the first beam and intersecting the first beam at a height suitable for leveling a plane off for landing and of supersonic frequency differing from the frequency of the first beam by such an amount as to produce at the intersection of the beam a beat note at a third frequency.

5. A landing field having means for directing substantially at a gliding angle from a position leaving adequate landing space behind it a sound beam at a supersonic frequency, and having means for directing from the edge of the field behind said position a second beam at a flatter angle in the same direction as the first beam and intersecting the first beam at a height suitable for leveling a plane off for landing and of supersonic frequency differing from the frequency of the first beam by such an amount as to produce a beat note at a third frequency, in combination with a pair of detecting means adapted to be mounted in space relationship on an aircraft approaching said field, said detecting means including microphones sensitive to said supersonic frequencies but insensitive to other frequencies.

6. A landing field having means for directing substantially at a gliding angle from a position leaving adequate landing space behind it a sound beam at a supersonic frequency, and having means for directing from the edge of the field behind said position a second beam at a flatter angle in the same direction as the first beam and intersecting the first beam at a height suitable for leveling a plane off for landing and of supersonic frequency differing from the frequency of the first beam by such an amount as to produce a beat note at an audible frequency, in combination with a pair of microphones mounted in spaced relation on an aircraft approaching said field, and means for substantially restricting the output of said microphones to the respective frequencies of said beams.

7. A landing field having means for directing substantially at a gliding angle a position leaving adequate landing space behind it a sound beam at a supersonic frequency, and having means for directing from the edge of the field behind said position a second beam at a flatter angle in the same direction as the first beam and intersecting the first beam at a height suitable for leveling a plane off for landing and of supersonic frequency differing from the frequency of the first beam by such an amount as to produce a beat note at an audible frequency, in combination with a pair of microphones mounted in spaced relation on an aircraft approaching said field, and acoustic filter means connected with said microphones whereby the actuating energy impressed upon said microphones is predominantly of the frequencies of the respective beams.

SAMUEL E. ADAIR.